United States Patent [19]

Kunis et al.

[11] Patent Number: 5,249,360
[45] Date of Patent: Oct. 5, 1993

[54] METHOD OF RECONDITIONING VALVES

[75] Inventors: Alvin J. Matthews, Pittsburgh; Wade A. Kunis, East Pittsburgh, both of Pa.

[73] Assignee: Westinghouse Air Brake Company, Wilmerding, Pa.

[21] Appl. No.: 3,941

[22] Filed: Jan. 19, 1993

Related U.S. Application Data

[63] Continuation of Ser. No. 736,992, Jul. 29, 1991, abandoned.

[51] Int. Cl.⁵ .............................................. B23P 6/00
[52] U.S. Cl. ........................ 29/890.121; 29/890.128; 29/407; 29/402.06
[58] Field of Search ............... 29/890.121, 888.42, 29/888.011, 402.03, 402.04, 402.05, 402.06, 402.18, 407, DIG. 7, 890.124, 890.128; 15/302, 320; 134/42; 303/33

[56] References Cited

U.S. PATENT DOCUMENTS

| | | | |
|---|---|---|---|
| 2,958,561 | 11/1960 | May | 303/8 |
| 3,208,801 | 9/1965 | McClure | 303/36 |
| 3,349,463 | 10/1967 | Kittelson | 29/888.42 |
| 3,400,440 | 9/1968 | Carlson | 29/890.121 |
| 3,504,950 | 4/1970 | McClure | 303/35 |
| 4,227,292 | 10/1980 | Kipling | 29/402.04 |
| 4,593,445 | 6/1986 | Snyder et al. | 29/402.18 X |
| 4,900,238 | 2/1990 | Shigemi et al. | 29/402.03 X |
| 4,916,794 | 4/1990 | Loonam | 29/402.03 X |
| 5,129,145 | 7/1992 | Matthews et al. | 29/890.121 |

OTHER PUBLICATIONS

Marks' Standard Handbook for Mechanical Engineers, Eighth Edition, McGraw-Hill, 1979, pp. 6-150, 151; 13-60, 61; 13-71, 72.

Primary Examiner—Mark Rosenbaum
Assistant Examiner—S. Thomas Hughes
Attorney, Agent, or Firm—Jor

[57] ABSTRACT

An inlet valve reconditioning process is disclosed which includes soaking the inlet valve, as removed from a valve body, in a cleaning solution for a period of time sufficient to loosen foreign material from all exposed surfaces of the valve, disassembling the valve into its component parts, cleaning the various component parts with the cleaning solution, reaming cavities formed in the male and female members of the valve, cleaning the valve seat, relapping the valve stem and reassembling the inlet valve into the valve body. The valve can be reused for its intended purposes within such a valve body without loss of either efficiency or durability.

11 Claims, No Drawings

METHOD OF RECONDITIONING VALVES

This is a continuation of application Ser. No. 07/736,992, filed Jul. 29, 1991, now abandoned.

CROSS-REFERENCE TO RELATED APPLICATIONS

The invention claimed in this application is closely related to the following concurrently filed applications owned by the assignee of this invention. "Valve Reconditioning Process" having Ser. No. 07/736,979, now U.S. Pat. No. 5,129,145; "Apparatus for Removing Press Fit Pins" having Ser. No. 07/737,087, now abandoned; and "Valve Seat Reconditioning Apparatus" having Ser. No. 07/737,094, now abandoned.

The disclosure in each of the above identified concurrently filed patent applications being incorporated herein by reference thereto.

FIELD OF THE INVENTION

The present invention relates, in general, to fluid pressure operated valves and, more particularly, this invention relates to a fluid pressure operated valve reclaiming process for a valve that has been removed from a valve body so that such valve can be reused for its intended purposes within such valve body without loss of either efficiency or durability.

BACKGROUND OF THE INVENTION

Prior to the present invention, it has been known to recondition fluid pressure operated valves. Such valves, for example, may be pneumatic operated brake valves or railway cars and locomotives or they may be hydraulic or pneumatic pressure valves used in various applications in the transportation industry.

In the past, when reconditioning these valves, it has been necessary to remove valves and valve bushings from the main body of a valve and replace these components with new bushings and valves in order to provide suitable sealing.

Obviously, this practice is costly both to the company involved in reconditioning these valves as well as the end user of such valves who must pay for such reconditioning. During use, the ends of the valve bushings which carry a valve seat thereon can become worn during normal operation. When this occurs, leakage will begin and will progress to the point where the valve must be torn apart and certain components replaced therein.

SUMMARY OF THE INVENTION

The present invention provides a fluid pressure operated valve reclaiming process. Such reclaiming process is used on a valve that has been removed from a valve body. Use of this process enables such valve to be reused for its intended purposes within the valve body without loss of efficiency or durability. Such valve reclaiming process includes the steps of placing such valve as removed from the valve body into a preselected cleaning solution allowing such valve to soak in such preselected cleaning solution for a period of time which is at least sufficient to loosen substantially all of the extraneous foreign material that may be adhered to all exposed surfaces of such valve. After such extraneous foreign material has been loosened in the soaking step, it is then removed from the external surface of the valve. The male member portion of the valve is then removed from the female member portion of such valve thereby exposing a spring, a spring seat and a valve stem contained within a cavity formed in each of such male member portion and such female member portion of the valve.

Such spring, spring seat and valve stem are then removed from the cavities in such male member portion and such female member portion. The spring seat and valve stem are then cleaned to remove any extraneous foreign material adhered thereto. The threaded portion of the male member portion of the valve is lapped and the threaded portion of such female member portion of the valve is also lapped. The cavity formed in the male member portion of such valve is then reamed. Such male member portion is cleaned to remove all material adhered thereto by lapping the threaded portion and such reaming of the cavity formed therein. Removing a preselected cleaning solution used on the male member portion during the cleaning procedure discussed above. The valve seat contained within such cavity of the male member portion of the valve is then cleaned. Likewise, the cavity formed in such female member portion of the valve is also cleaned. The cleaning solution used on the female member portion and the valve seat portion is then removed. The valve stem, after cleaning, is then relapped with the valve seat to insure a good sealing process. After relapping, the lapping compound used is then removed from both the valve stem and the valve seat and the valve is now ready to be reassembled.

OBJECTS OF THE INVENTION

It is, therefore, one of the primary objects of the present invention to provide a fluid pressure operated valve reclaiming process which will allow a valve to be reused for its intended purposes.

Another object of the present invention is to provide a fluid pressure operated valve reclaiming process in which the reclaimed valve will have substantially the same efficiency as a new valve.

Still another object of the present invention is to provide a fluid pressure operated valve reclaiming process in which the reclaimed valve will exhibit essentially the same durability as the new valve.

A further object of the present invention is to provide a fluid pressure operated valve reclaiming process which will result in significant cost savings to the end user.

An additional object of the present invention is to provide a fluid pressure operated valve reclaiming process which is relatively simple to perform.

A still further object of the present invention is to provide a fluid pressure operated valve reclaiming process which requires a minimum number of new component parts.

In addition to the numerous objects and advantages of the fluid pressure operated valve reclaiming process described above, various other objects and advantages of the present invention will become more readily apparent to those persons who are skilled in the fluid pressure operated reclaiming art from the following, more detailed description of the invention.

DETAILED DESCRIPTION

The present invention involves a reclaiming process for a fluid pressure operated valve. Such fluid pressure operated valve being removed from a valve body. Use of this reclaiming process enables such valve to be reused for its intended purposes within the valve body without suffering a loss of either efficiency or durability.

Such valve reclaiming process includes placing such valve as removed from the valve body into a preselected cleaning solution. Preferably, this cleaning solution will be at least on of a mineral spirit, a carburetor cleaner or a mixture of mineral spirits and carburetor cleaner.

After the valve is placed into the cleaning solution, it is allowed to soak for a predetermined period of time. Such period of time must be at least sufficient to ensure loosening of substantially all extraneous foreign material from all of the exposed surfaces of such valve. Depending upon the tenacity of the adherence of such foreign material with the exposed surfaces of the valve, such period of time may be as little as about twenty minutes up to about 1,440 minutes. In any event, this time would be no more than that required to achieve the loosening of the extraneous foreign material from the exposed surfaces of the valve.

After soaking for the prescribed period of time all such extraneous foreign material is removed from such external surfaces of the valve. The removal of such extraneous foreign material from the external surfaces of the valve includes the step of brushing external surfaces with a brush, preferably a wire brush.

Once the external surfaces of the valve have been cleaned, the male member portion of the valve is removed from the female member portion of such valve. Removal of the male member portion from the female member portion of the valve exposes a spring, a spring seat and a valve stem which will contain within a cavity formed in each of such male member portion and such female member portion of the valve. The spring, spring seat and the valve stem will then be removed from the cavity.

The spring seat and valve stem are then cleaned to remove any extraneous foreign material adhered thereto. The cleaning of such spring seat and valve stem includes the step of brushing, preferably with a wire brush.

The cavity formed in the male member portion of such valve is then reamed after such male member portion of the valve is cleaned with a preselected cleaning solution to remove all material adhered thereto by such reaming of the cavity. Such preselected cleaning solution is then removed from such male member portion of the valve when a cleaning process is completed. Thereafter, a valve seat contained within the cavity of such male member portion and the female member formed in such cavity are cleaned after the cleaning solution is removed from the male member portion to the valve. The valve seat and valve stem are now ready for relapping to ensure a good sealing surface. After relapping is achieved, the lapping compound is removed from each of such valve stem and such valve seat.

Prior to reassembling each of the male member portion and the female member portion are dried with required compressed air. After drying, the valve is now ready for reassembly and will preferably include the step of replacing the spring removed from the cavity from the male member portion and the female member portion of the valve with a new spring.

It has been found that this fluid pressure operated valve reclaiming process is particularly useful when such valve is an inlet valve. Further, it has been found desirable to perform testing on the inlet valve prior to its reassembly into the valve body as well as testing such valve after it has been reassembled into the valve body to ensure overall performance of the reconditioned valve.

While a number of presently preferred and alternative embodiments of the fluid pressure operated valve reclaiming process have been discussed in considerable detail above, it should be understood that those persons who are skilled in the valve art that various other modifications and adaptations of the invention can be made without departing from the spirit and scope of the appended claims.

We claim:

1. A fluid pressure operated valve reclaiming process for an inlet valve removed from a valve body that will enable such inlet valve to be reused for its intended purpose within such valve body without loss of either efficiency or durability, said valve reclaiming process comprising the steps of:
   (a) placing said inlet valve as removed from said valve body into a preselected cleaning solution;
   (b) soaking said inlet valve in said preselected cleaning solution for a period of time which is at least sufficient to loosen substantially all extraneous foreign material from all exposed surfaces of said inlet valve;
   (c) removing all said extraneous foreign material from said external surfaces of said inlet valve loosened in step (b);
   (d) removing a male member portion from a female member portion of said inlet valve thereby exposing a spring, a spring seat and a valve stem contained within a cavity formed in each of said male member portion and said female member portion of said inlet valve;
   (e) removing said spring, said spring seat and said valve stem exposed in step (d) from said cavity;
   (f) cleaning said spring seat and said valve stem to remove any extraneous foreign material adhered thereto;
   (g) reaming said cavity formed in said male member portion of said inlet valve;
   (h) cleaning said male member portion of said inlet valve with said preselected cleaning solution to remove all material adhered thereto by said reaming of said cavity in step (g);
   (i) removing said preselected cleaning solution applied in step (h) from said male member portion;
   (j) cleaning a valve seat contained within said cavity of said male member portion of said inlet valve;
   (k) cleaning said cavity formed in said female member portion of said inlet valve with said preselected cleaning solution;
   (l) removing said preselected cleaning solution applied in step (k) from said female member portion;
   (m) relapping said valve stem cleaned in step (f) to said valve seat cleaned in step (j) with a lapping compound to ensure a good sealing surface;
   (n) removing said lapping compound used in step (m) from said valve stem and said valve seat;
   (o) reassembling said inlet valve; and
   (p) reassembling said inlet valve into said valve body.

2. A fluid pressure operated valve reclaiming process, according to claim 1, wherein said preselected cleaning solution is at least one of mineral sprints, carburetor cleaner and a mixture thereof.

3. A fluid pressure operated valve reclaiming process, according to claim 1, wherein said period of time which is at least sufficient to loosen substantially all said extraneous foreign material from all said exposed surfaces of said inlet valve is at least about 20 minutes.

4. A fluid pressure operated valve reclaiming process, according to claim 3, wherein said period of time which is at least sufficient to loosen substantially all said extraneous foreign material from all said exposed surfaces of said inlet valve is between about 20 minutes and 1,440 minutes.

5. A fluid pressure operated valve reclaiming process, according to claim 1, wherein step (c) includes the step of brushing said external surfaces of said inlet valve with a wire brush.

6. A fluid pressure operated valve reclaiming process, according to claim 1, wherein step (f) includes the step of brushing said spring seat and said valve stem with a wire brush.

7. A fluid pressure operated valve reclaiming process, according to claim 1, wherein step (l) includes the step of drying said male member portion with compressed air.

8. A fluid pressure operated valve reclaiming process, according to claim 1, wherein step (l) includes the step of drying said female member portion with compressed air.

9. A fluid pressure operated valve reclaiming process, according to claim 1, wherein step (o) includes the step of replacing said spring removed in step (e) with a new spring.

10. A fluid pressure operated valve reclaiming process, according to claim 1, wherein said valve reclaiming process includes the additional step of testing said inlet valve prior to reassembly into said valve body.

11. A fluid pressure operated valve reclaiming process, according to claim 1, wherein said valve reclaiming process includes the additional steps of:
retapping a threaded portion of said male member portion of said inlet valve;
retapping a threaded portion of said female member portion of said inlet valve; and
cleaning said male member portion and said female member portion after said retapping.

* * * * *

UNITED STATES PATENT AND TRADEMARK OFFICE
CERTIFICATE OF CORRECTION

PATENT NO. : 5,249,360

DATED : 10/5/93

INVENTOR(S) : Alvin J. Matthews and Wade A. Kunis

It is certified that error appears in the above-identified patent and that said Letters Patent is hereby corrected as shown below:

Column 5, line 20, delete "(1)" and insert --(i)--

Signed and Sealed this

Fifth Day of April, 1994

*Attest:*

BRUCE LEHMAN

*Attesting Officer*     *Commissioner of Patents and Trademarks*